United States Patent
Liu et al.

(10) Patent No.: US 7,302,864 B2
(45) Date of Patent: *Dec. 4, 2007

(54) TORQUE SENSOR

(75) Inventors: James Zt Liu, Hudson, NH (US); Steven J. Magee, Lena, IL (US)

(73) Assignee: Honeywell International Inc., Morristown, NJ (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/233,879

(22) Filed: Sep. 23, 2005

(65) Prior Publication Data

US 2007/0068278 A1 Mar. 29, 2007

(51) Int. Cl.
*G01L 1/22* (2006.01)
(52) U.S. Cl. ...................................................... 73/862
(58) Field of Classification Search ................ 73/861, 73/702, 715, 723, 650, 778, 862.042, 862; 310/338; 438/107; 367/157
See application file for complete search history.

(56) References Cited

U.S. PATENT DOCUMENTS

| | | | |
|---|---|---|---|
| 4,213,104 A | | 7/1980 | Cullen et al. |
| 4,295,102 A | | 10/1981 | Schmidt et al. |
| 4,530,143 A | * | 7/1985 | Casarcia ............... 29/407.02 |
| 5,774,423 A | * | 6/1998 | Pearce et al. ............ 367/157 |
| 6,293,136 B1 | | 9/2001 | Kim ......................... 73/19.03 |
| 6,314,791 B1 | | 11/2001 | Rapp et al. ............... 73/24.06 |
| 6,621,379 B1 | | 9/2003 | Goetz et al. |
| 6,640,613 B2 | | 11/2003 | Rapp et al. ............... 73/24.01 |
| 6,810,750 B1 | | 11/2004 | Kiefer et al. ............... 73/801 |
| 6,853,067 B1 | | 2/2005 | Cohen et al. |
| 6,895,828 B2 | | 5/2005 | Nakatani et al. ....... 73/862.331 |
| 6,928,887 B2 | | 8/2005 | Nakane et al. ......... 73/862.331 |
| 6,928,888 B2 | | 8/2005 | Nakane et al. ......... 73/862.332 |
| 7,000,298 B2 | * | 2/2006 | Cook et al. ............... 29/25.41 |
| 7,095,157 B2 | * | 8/2006 | Sung ....................... 310/313 R |
| 7,165,455 B2 | * | 1/2007 | Magee et al. ............... 73/650 |
| 7,198,981 B2 | * | 4/2007 | Avramescu et al. ......... 438/107 |
| 2004/0133348 A1 | | 7/2004 | Kalantar-Zadeh et al. ..... 702/2 |

(Continued)

FOREIGN PATENT DOCUMENTS

EP 0930659 A2 7/1999

(Continued)

OTHER PUBLICATIONS

Montress, G.K., Parker T.E., Andres, D., *Review of SAW Oscillator Performance*, 1994 Ultrasonics Symposium, pp. 43-54.

(Continued)

*Primary Examiner*—Jewel Thompson
(74) *Attorney, Agent, or Firm*—Kermit D. Lopez; Luis M. Ortiz

(57) ABSTRACT

A plurality of acoustic wave sensing devices can be provided, which are mechanically simulated for implementation upon a quartz wafer substrate. The quartz wafer substrate is appropriately etched to produce a quartz diaphragm from the quartz wafer substrate. A plurality of torque SAW sensing resonators can then be located upon the quartz wafer substrate, which is based upon previously mechanically simulated devices for implementation upon the substrate, together with a quartz cover to thereby produce a quartz torque sensor package from the quartz wafer substrate.

20 Claims, 2 Drawing Sheets

U.S. PATENT DOCUMENTS

| | | | |
|---|---|---|---|
| 2004/0159154 A1 | 8/2004 | Dollinger et al. | 73/602 |
| 2005/0022614 A1 | 2/2005 | Naruse et al. | 73/862.326 |
| 2005/0116794 A1 | 6/2005 | Mizuno | |
| 2005/0160835 A1 | 7/2005 | Masaki et al. | 73/862.333 |
| 2005/0166685 A1 | 8/2005 | Boiten | 73/862.191 |
| 2007/0014889 A1* | 1/2007 | McHale et al. | 426/5 |

FOREIGN PATENT DOCUMENTS

| | | |
|---|---|---|
| GB | 2235533 A | 3/1991 |
| GB | 2361318 A | 10/2001 |

OTHER PUBLICATIONS

Bill Drafts, Acoustic Wave Technology Sensors, IEEE Transactions on Microwave Theory and Techniques, Piscataway NJ, US, vol. 49, No. 4, Apr. 2001.

* cited by examiner

TORQUE SENSOR

TECHNICAL FIELD

Embodiments are generally related to wireless sensing methods and systems. Embodiments are also related to torque sensors. Embodiments are additionally related to acoustic wave devices and sensors. Embodiments are also related to All Quartz Packaging (AQP) torque sensor technology.

BACKGROUND OF THE INVENTION

Acoustic wave sensors are utilized in a variety of sensing applications, such as, for example, temperature and/or pressure sensing devices and systems. Acoustic wave devices have been in commercial use for over sixty years. Although the telecommunications industry is the largest user of acoustic wave devices, they are also used for in other areas for sensor applications, e.g., (chemical vapor detection). Acoustic wave sensors are so named because they use a mechanical, or acoustic, wave as the sensing mechanism. As the acoustic wave propagates through or on the surface of the material, any changes to the propagation path affect the characteristics of the wave.

Changes in acoustic wave characteristics can be monitored by measuring the frequency, amplitude or phase characteristics of the sensor and can then be correlated to the corresponding physical quantity or chemical quantity that is being measured. Virtually all acoustic wave devices and sensors utilize a piezoelectric substrate to generate the acoustic wave. Three mechanisms can contribute to acoustic wave sensor response, i.e., mass-loading, visco-elastic and acousto-electric effect. The mass-loading of chemicals alters the frequency, amplitude, and phase and Q value of such sensors. Most acoustic wave chemical detection sensors, for example, rely on the mass sensitivity of the sensor in conjunction with a chemically selective coating that absorbs the vapors of interest resulting in an increased mass loading of the acoustic wave sensor.

Examples of acoustic wave sensors include acoustic wave detection devices, which are utilized to detect the presence of substances, such as chemicals, or environmental conditions such as temperature and pressure. An acoustical or acoustic wave (e.g., SAW/BAW) device acting as a sensor can provide a highly sensitive detection mechanism due to the high sensitivity to surface loading and the low noise, which results from their intrinsic high Q factor. Surface acoustic wave devices are typically fabricated using photolithographic techniques with comb-like interdigital transducers placed on a piezoelectric material. Surface acoustic wave devices may have a delay line, a filter, or a resonator configuration. Bulk acoustic wave device are typically fabricated using a vacuum plater. The choice of the electrode materials and the thickness of the electrode are controlled by filament temperature and total heating time. The size and shape of electrodes are defined by proper use of masks. One type of bulk device, the acoustic plate mode device, however, can be constructing utilizing techniques similar to that utilized for configuring a surface wave device.

One area where acoustic wave sensors seem to offer advantages is in the field of torque sensing. In systems incorporating rotating drive shafts, for example, it is often necessary to know the torque and speed of such shafts in order to control the same or other devices associated with the rotatable shafts. Accordingly, it is desirable to sense and measure the torque in an accurate, reliable, and inexpensive manner.

Sensors to measure the torque imposed on rotating shafts, such as but not limited to shafts in automotive vehicles, are utilized in many applications. For example, it might be desirable to measure the torque on rotating shafts in a vehicle's transmission, or in a vehicle's engine (e.g., the crankshaft), or in a vehicle's automatic braking system (ABS) for a variety of purposes known in the art.

One application of this type of torque measurement is in electric power steering systems wherein an electric motor is driven in response to the operation and/or manipulation of a vehicle steering wheel. The system then interprets the amount of torque or rotation applied to the steering wheel and its attached shaft in order to translate the information into an appropriate command for an operating means of the steerable wheels of the vehicle.

Torque sensors, particularly SAW-based torque sensors, provide a generally unpredictable output frequency temperatures sensitivity resulting in excess calibration points for each sensor. Additionally, such devices offer poor short term and long term stability, because they lack a cover and hermetic sealing features. Additionally, the substrate mounting and packaging techniques are unsuitable for high-demand torque applications. It is therefore believed that in order to overcome these deficiencies, an improved torque sensor device must be designed and implemented. Such a device is described in greater detail herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for an improved sensor-based method and system.

It is another aspect of the present invention to provide for an improved SAW sensor-based method and system.

It is yet a further aspect of the present invention to provide for a quartz SAW sensor-based method and system.

The aforementioned aspects of the invention and other objectives and advantages can now be achieved as described herein. Quartz sensor-based methods and systems are disclosed in which a plurality of sensing membranes can be mechanically simulated for implementation upon a quartz wafer substrate. The quartz wafer substrate can then be appropriately etched to produce a quartz diaphragm from the quartz wafer substrate. A plurality of sensing elements and devices (e.g., torque SAW resonator) can then be located upon the quartz wafer substrate, which is based upon the previously simulated sensing membranes for implementation upon the substrate to thereby produce a quartz sensor package from the quartz wafer substrate for torque sensing operations.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
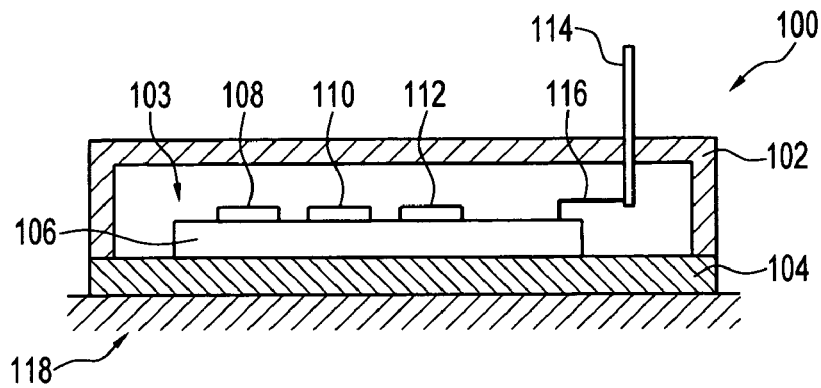
FIG. 1 illustrates a side-view of an All Quartz Packaging (AQP) torque sensor apparatus, which can be implemented in accordance with one embodiment.

FIG. 1 illustrates a side-view of an All Quartz Packaging (AQP) torque sensor apparatus 100, which can be implemented in accordance with one embodiment. In general, the torque sensor apparatus 100 depicted in FIG. 1 includes a cover 102, which is preferably configured from quartz. The cover 102 is connected to a substrate or base 104, which can also be configured from quartz. A diaphragm 106 can be formed from the SAW substrate or base 104. The diaphragm 106 can also be formed from a quartz material, depending upon design considerations.

One or more acoustic sensing elements 108, 110, 112 can then be configured upon or from the diaphragm 106. Note that the diaphragm 106 can bend slightly when subject to a stress such as torque. The acoustic sensing elements 108, 110, 112 are preferably provided as interdigital transducers formed upon diaphragm 106. Note that diaphragm 106 can be provided as a separate quartz component bonded to substrate or base 104 or can be configured directly from base 104. That is, the diaphragm 106 can be etched from the substrate 104.

A wire connection 116 can be bonded to the diaphragm 106 and to an antenna 114 that protrudes through the cover 102. Antenna 114 transmits torque detection data collected by apparatus 100. The base 104 can be provided at a fixed end 118, which can be for example, a connection to a device that experiences torque, such as, for example, a shaft in an automobile engine. A gap 103 is generally formed between the cover 102 and the base 104.

An inert gas is preferably encapsulated between the cover 102 and the base 104 and surrounds the acoustic sensing elements 108, 110, 112 and the diaphragm 106. The quartz cover 102 and the SAW base 104 are preferably implemented via an AQP design. The cover 102 and the base 104 are preferably formed from identically oriented quartz because of the large anisotropy resulting from the thermal expansion of quartz; The cover 102 and the base 104 are preferably bonded to one another by a glass frit or through direct bonding (e.g., welding), depending upon design considerations.

Note that the sensing elements 108, 110 112 can be implemented, for example, as acoustic wave sensing elements, such as for example, a surface acoustic wave (SAW) or bulk acoustic wave (BAW) sensing component. If torque sensing elements 108, 110, 112 comprise acoustic wave sensing elements, then substrate 104 may be configured as a piezoelectric quartz substrate. Sensing elements 108, 100, 112 can also be provided as, for example, one or more of the following components: a surface acoustic wave filter, a surface acoustic wave resonator, a surface acoustic wave delay line, a bulk acoustic wave resonator or a combination thereof, depending upon design considerations.

Figure 2:
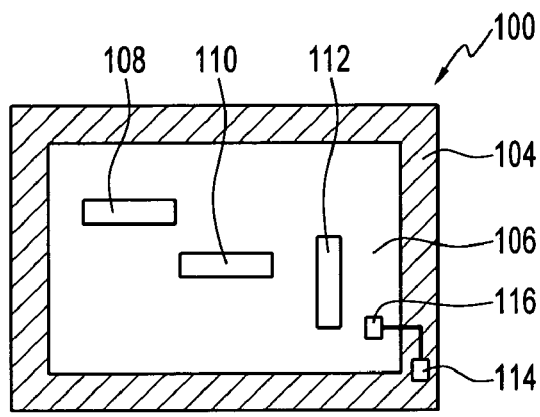
FIG. 2 illustrates a top view of the AQP torque sensor apparatus depicted in FIG. 1 in accordance with one embodiment.
Figure 3:
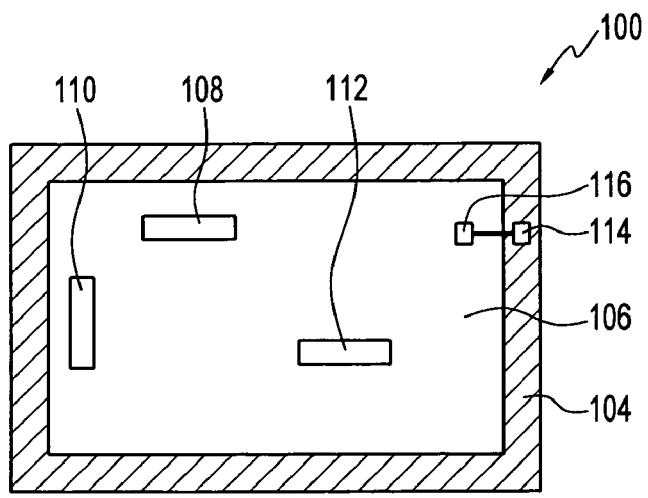
FIG. 3 illustrates a top view of the AQP torque sensor apparatus depicted in FIG. 1 in accordance with another embodiment.

FIG. 2 illustrates a top view of the AQP torque sensor apparatus 100 depicted in FIG. 1 in accordance with one embodiment. FIG. 3 illustrates a top view of the AQP torque sensor apparatus 100 depicted in FIG. 1 in accordance with another embodiment. Note that in FIGS. 1-3, identical or similar parts or elements are generally indicated by identical reference numerals. In the configuration depicted in FIG. 2, the acoustic sensing elements 108, 110, 112 are depicted in an incline step configuration, while in FIG. 3 elements 108, 110, 112 are arranged in a decline step configuration.

Note that the acoustic sensing elements 108, 110, 112 can be implemented as acoustic wave resonators, acoustic wave filters, or in an acoustic wave delay line configuration. Depending upon design considerations, acoustic sensing elements 108, 110, 112, can also be implemented in the context of a flexural plate mode (FMP) device, an acoustic plate mode device, a shear-horizontal acoustic plate mode (SH-APM) device, an amplitude plate mode (APM) device, a thickness shear mode (TSM) device, a surface acoustic wave mode (SAW) device, a bulk acoustic wave mode (BAW) device, a torsional mode device, a love wave device, a leaky surface acoustic wave mode (LSAW) device, a pseudo surface acoustic wave mode (PSAW) device, a transverse mode data, surface-skimming mode device, a surface transverse mode device, a harmonic mode device, or an overtone mode device.

It should be appreciated that although only three sensing elements 108, 110, 112 are depicted in FIGS. 1-3, fewer or more sensing elements may be utilized. For example, in the configuration depicted in FIG. 4, which is explained in greater detail below, a single and larger acoustic sensing element 408 is utilized. Additionally, it is important to appreciate that although apparatus 100 is illustrated in a generally square or rectangular shaped configuration, apparatus 100 may also be provided in other shapes, such as, for example, oval or circular-shaped configurations.

Figure 4:
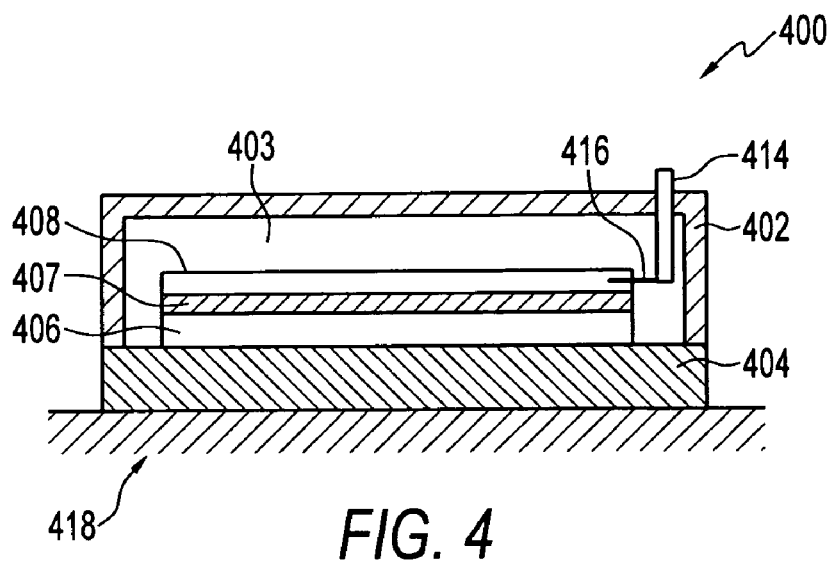
FIG. 4 illustrates a side view of an AQP torque sensor apparatus, which can be implemented in accordance with another embodiment.

FIG. 4 illustrates a side view of an AQP torque sensor apparatus 400, which can be implemented in accordance with another embodiment. The AQP torque sensor apparatus 400 is similar to the apparatus 100 depicted in FIGS. 1-3, with some important differences. In generally, apparatus 400 includes a single acoustic sensing resonator or sensing element 408 configured upon a quartz substrate 404 in association with a quartz diaphragm 406 etched from the quartz wafer substrate.

The acoustic sensing resonator 408 detects a torque associated with an object subject to the torque. Such an object is preferably attached to a fixed end 418. An optional quartz layer 407 can be provided between diaphragm 406 and the torque sensing resonator or sensing element 408 (e.g., a single interdigital transducer) to provide additional support to the sensing element 408. A wire connection 416 can extend from the sensing element 408 to an antenna 414 that wirelessly transmit torque detection data from apparatus 400.

In alternative embodiments, the wire connection 416 may instead be attached to the quartz layer 407 or the diaphragm 406. Note that the use of the quartz layer 407 is optional and may not be necessary depending upon design considerations. In order to provide adequate short term and long term stability, the diaphragm 406, quartz layer 408 and/or the SAW sensing element 408 should be encapsulated with inert gases such as $N_2$, Argon, and so forth. Thus, similar to the configuration depicted in FIGS. 1-3, a gap 402 is formed between the quartz cover 402 and the quartz substrate or base 404. The quartz cover 402 can be bonded to the quartz substrate or base 404 by, for example, a glass frit or through direct bonding (e.g., welding), depending upon design considerations. The quartz cover 402 is thus located proximate to the quartz substrate or base 404, such that the cover 402 maintains and protects one or more acoustic sensing resonators 408 by encapsulating the acoustic sensing resonator(s) 408 and the quartz substrate 404 with an inert gas.

The embodiments disclosed herein generally describe a system and method for the mechanical design of an etched quartz diagram (e.g., diaphragm 106, 406) for torque sensing and techniques for deep quartz etching, direct quart-to-quartz packaging, and metal connections (e.g., antenna 114, 414), which protrude external to the quartz cage or package. Thus, a new methodology and system for SAW torque sensor interrogation is described herein with respect to varying embodiments. Such concepts can be applied to sensing configurations based on an implementation of one or more SAW resonators for torque detection purposes.

Depending upon the torque range to be measured, the quartz diaphragm 106 and/or 406 described herein, which will experience torque can be configured either from a thin quartz wafer (i.e., without any etched regions) supported at the edges by another quartz wafer utilized for packaging and overpressure stops, or by selectively etching selectively the quartz in order to obtain an etched quartz torque sensing diaphragm. The quartz diaphragm can be formed by wet and/or dry quartz etching for smaller torque measurements.

In general, increasing the frequency of SAW sensor operations can determine a strong reduction of dimensions of SAW devices, while the frequency bandwidth restrictions for preserving operations in the license-free frequency band can be easily fulfilled. The standard technology of SAW filters can also be applied for defining the interdigital transducer (IDT) domain. Because the direct quartz bonding technology requires a very flat surface, the use of metal ion implantation as a method for creating a conductive path inside an all-quartz package to outside bonding pads is preferred. Titanium represents one type of a preferred metal, the energy and dose of titanium implantation being determined by the designed electrical resistivity of the conductive path, as required by the adaptation circuit to sensor antenna.

The selection of materials for packaging and the encapsulation SAW torque sensor apparatus 100, 400 can have a tremendous effect on temperature dependence characteristics and long-term stability, because any thermal stress at the surface of the quartz substrate where the SAW torque sensor apparatus 100, 400 is located can change the operation frequency. Packaging of the SAW torque sensor apparatus 100, 400 is therefore a critical process, similar to that of piezoresistive torque sensors. In order to avoid thermal stresses due to thermal expansion coefficient mismatch, and to be able to protect the quartz diaphragm by constructing an overpressure stop, a true all-quartz packaging (TAQP) technique can be implemented, for example, in the context of a direct quartz-to-quartz wafer bonding process as follows:

1. Micro-roughness evaluation of as-received quartz wafers (AFM:RMS<1.3 nm);
2. Micro-roughness evaluation of processed quartz cover (wafer level) and quartz SAW substrate (wafer level) (AFM: RMS<1.3 nm);
3. Hydrophilisation treatment of quartz cover and quartz SAW substrate in boiled, concentrated $HNO_3$ for 30-50 minutes (i.e., generally, the RMS decreases after this treatment);
4. Rinsing in DI water followed by drying;
5. Cleaning in Megasonic RCA 1 solution ($NH_4OH:H_2O_2:H_2O=1:1:5$) for 10 minutes, followed by $HCl:H_2O_2:H_2O=1:1:6$ for 10 minutes;
6. Drying of both quartz cover and quartz SAW substrate;
7. Immediate contact and alignment of cover and SAW substrate;
8. Thermal annealing in $N_2$ for 1 hour at a temperature T<450° C. (i.e., temperature should be ramped up and down at approximately 10° C./min); and
9. Bonding control, wherein the "crack opening" method is utilized by means of a 50 nm thin blade.

For SAW devices (e.g., apparatus 100, 400), which are utilized for high torque measurements, a number of other processing steps may be implemented for the SAW quartz wafer fabrication. An example of such processing steps is provided below:

1. Micro-roughness evaluation of as-received double-side chemical-polished quartz SAW wafers;
2. Wafer cleaning;
3. Deposition of thin metal layer used as resist mask in next step;
4. Photolithographic process for channel-gap forming, required for metal path to pass from SAW surface to external connection(s);
5. RIE etching of channel-gap;
6. Metal removal;
7. Wafer cleaning;
8. Deposition of the thin film layer utilized as a resist mask for titanium implantation;
9. Photolithographic process for titanium implantation;
10. Titanium implantation for buried conductive paths forming;
11. Deposition of the metal layer used for SAW electrode forming and external contact;
12. Photolithographic process for metal patterning;
13. Metal etching;
14. Wafer cleaning;
15. Hydrophilisation treatment of the quartz SAW wafer in boiled, concentrated $HNO_3$ for 30-50 minutes;
16. Rinsing in DI water followed by drying;
17. Cleaning in Megasonic RCA 1 solution ($NH_4OH:H_2O_2:H_2O=1:1:5$) for 10 minutes, followed by $HCl:H_2O_2:H_2O=1:1:6$ for 10 minutes; and
18. Drying.

Upon completion of the processing steps indicated above, a similar set of processing steps can be implemented upon another quartz wafer to form a quartz base plate, such as, for example, base 104, 404. When the two quartz wafers are ready for direct bonding, wafer dicing and chip assembling can be processed, as indicated below:

1. Contact and alignment of the quartz SAW wafer and quartz base plate;
2. Thermal annealing in $N_2$ for 1 hour at T<450° C., wherein the temperature should be ramped up and down with approximately 10° C./min;
3. Bonding control, wherein a "crack opening" method is utilized via a 50 mm blade;

4. Partial wafer dicing (i.e., a cut of thickness equal to the thickness of the quartz SAW wafer, and only in one direction);
5. Entire thickness dicing of the bonded wafers on the inter-chip spaces of the AQP microstructure;
6. Chip bonding with special resin on the package base plate;
7. Dispensing of the conductive resin for metal contacting from both chips;
8. Wire bonding;
9. Dispensing of the protective resin; and
10. Capping and welding.

In a similar manner, the technology for other fabrication solutions of AQP SAW torque sensors can be implemented. The quartz wafer could be etched, for example, by wet or dry etching. In an "all-quartz" sensor package, the electrode connections (e.g., wire connections 116, 416) to the antenna (e.g., antenna 114, 414) could be performed via "through the wafer" connections. In the "through the wafer" design, the "through" holes could be drilled by laser, ultrasound, or wet etching.

Figure 5:
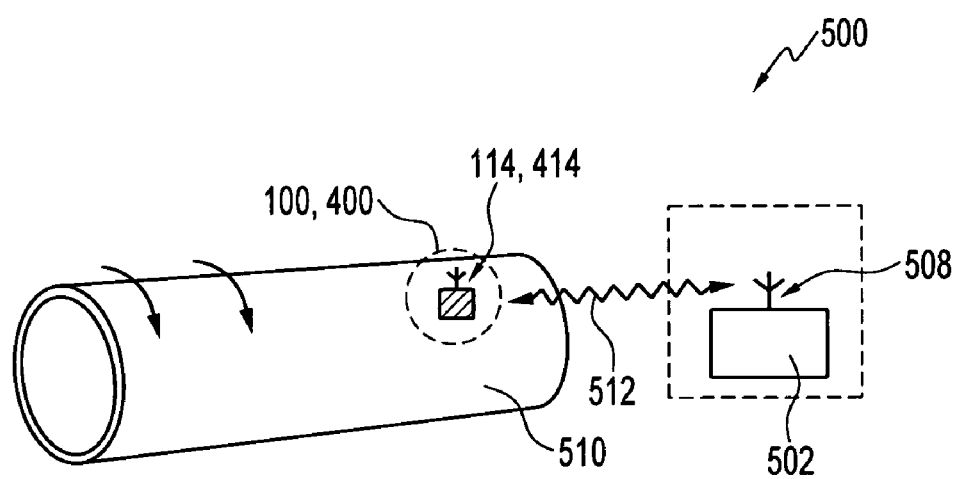
FIG. 5 illustrates a torque sensor system, which can be implemented in accordance with a preferred embodiment.

FIG. 5 illustrates a torque sensor system 500, which can be implemented in accordance with a preferred embodiment. FIG. 5 generally illustrates a high-level diagram of torque sensor system 500. Note that in FIGS. 1-5, identical or similar parts or elements are generally indicated by identical reference numerals. System 100 generally includes a rotatable member 510 such as a shaft upon which the torque sensing apparatus 100 or 400 can be located for detecting torque associated with rotating member 510. Torque sensor apparatus 100 or 400 respectively incorporates an antenna 114, 414, which can transmit and receive data to and from an electronics control unit 502 that incorporates an antenna 508. Note that the torque sensor 100 or 400 and its associated and respective antenna 114, 414 together can form a wireless torque sensor. The antenna 114, 414 can be provided as, for example, a coupler or a capacitive coupling antenna component. The antenna may also be configured as, for example, an inductive coupling or simply a linear antenna, depending upon design considerations.

The embodiments and examples disclosed herein generally describe an improved mechanical design and simulation method, and a technology for SAW sensor assembly and packaging oriented toward a more integrated fabrication and reduced calibration activity during testing stages. Such technology is based on the mechanical simulation of quartz-made pressure sensing membranes, selective quartz wafer etching for quartz diaphragms, metal ion implantation for metal connections and/or direct quartz-to-quartz wafer bonding for a low-price calibration-free SAW torque sensor.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A torque sensor apparatus, comprising:
   at least one acoustic sensing device configured upon a quartz substrate in association with a quartz diaphragm etched from said quartz wafer substrate, wherein said at least one acoustic sensing device detects a torque associated with an object subject to said torque; and
   a cover located proximate to said quartz substrate, wherein said cover comprises quartz and maintains and protects said at least one acoustic sensing device by encapsulating said at least one acoustic sensing device and said quartz substrate with an inert gas.

2. The apparatus of claim 1 wherein said quartz wafer substrate comprises a base substrate located proximate to said cover.

3. The apparatus of claim 2 wherein said base substrate and said quartz cover utilize identically oriented quartz.

4. The apparatus of claim 2 wherein said base is connected to said cover via a glass frit bond.

5. The apparatus of claim 2 wherein said base is connected to said cover via a direct bond.

6. The apparatus of claim 1 wherein said inert gas comprises Argon.

7. The apparatus of claim 1 wherein said inert gas comprise $N_2$.

8. The apparatus of claim 1 wherein said inert gas comprises Helium.

9. The apparatus of claim 2 wherein said base substrate is connected to said object that is subject to said torque.

10. The apparatus of claim 1 wherein said at least one sensing device comprises an acoustic wave resonator.

11. The apparatus of claim 1 wherein said at least one sensing device comprises an acoustic wave filter.

12. The apparatus of claim 1 wherein said at least one sensing device comprises an acoustic wave delay line.

13. The apparatus of claim 1 wherein said acoustic wave sensing device comprises at least one of the following types of devices:
   a flexural plate mode (FMP) device;
   an acoustic plate mode device;
   a shear-horizontal acoustic plate mode (SH-APM) device;
   an amplitude plate mode (APM) device;
   a thickness shear mode (TSM) device;
   a surface acoustic wave mode (SAW) device;
   a bulk acoustic wave mode (BAW) device;
   a torsional mode device;
   a love wave device;
   a leaky surface acoustic wave mode (LSAW) device;
   a pseudo surface acoustic wave mode (PSAW) device;
   a transverse mode data, surface-skimming mode device;
   a surface transverse mode device;
   a harmonic mode device; or
   an overtone mode device.

14. A torque sensor system, comprising:
   at least one acoustic sensing device configured upon a quartz substrate in association with a quartz diaphragm etched from said quartz wafer substrate, wherein said at least one acoustic sensing device detects a torque associated with an object subject to said torque;
   a cover located proximate to said quartz substrate, wherein said cover comprises quartz; and
   a base substrate configured from said quartz wafer substrate, wherein said base substrate is connected to said object that is subject to said torque and is located proximate to said cover, such that said cover maintains and protects said at least one acoustic sensing device by encapsulating said at least one acoustic sensing device and said quartz substrate with an inert gas and wherein said base substrate and said quartz cover utilize identically oriented quartz.

15. The system of claim 14 wherein said base is connected to said cover via a glass frit bond or a direct bond.

16. The system of claim 14 wherein said inert gas comprises Argon, $N_2$, or Helium.

17. A method for forming a torque sensor, comprising:
   configuring at least one acoustic sensing device upon a quartz substrate in association with a quartz diaphragm etched from said quartz wafer substrate, wherein said at east one acoustic sensing device detects a torque associated with an object subject to said torque;

locating a cover proximate to said quartz substrate, wherein said cover comprises quartz;

configuring a base substrate from said quartz wafer substrate; and connecting said base substrate to said object that is subject to said torque, such that said cover maintains and protects said at least one acoustic sensing device by encapsulating said at least one acoustic sensing device and said quartz substrate with an inert gas and wherein said base substrate and said quartz cover utilize identically oriented quartz.

18. The method of claim 17 wherein said base is connected to said cover via a glass frit bond or a direct bond.

19. The method of claim 17 wherein said inert gas comprises Argon, $N_2$, or Helium.

20. The method of claim 17 wherein said acoustic wave sensing device comprises at least one of the following types of devices:

a flexural plate mode (FMP) device;

an acoustic plate mode device;

a shear-horizontal acoustic plate mode (SH-APM) device;

an amplitude plate mode (APM) device;

a thickness shear mode (TSM) device;

a surface acoustic wave mode (SAW) device;

a bulk acoustic wave mode (BAW) device;

a torsional mode device;

a love wave device;

a leaky surface acoustic wave mode (LSAW) device;

a pseudo surface acoustic wave mode (PSAW) device;

a transverse mode data, surface-skimming mode device;

a surface transverse mode device;

a harmonic mode device; or an overtone mode device.

* * * * *